United States Patent [19]
Biel

[11] Patent Number: 5,983,555
[45] Date of Patent: Nov. 16, 1999

[54] FISHING HOOK REMOVER

[76] Inventor: Joseph W. Biel, 6425 Isles Rd., Brown City, Mich. 48416

[21] Appl. No.: 09/039,065

[22] Filed: Mar. 13, 1998

[51] Int. Cl.⁶ .................................................. A01K 97/18
[52] U.S. Cl. ............................................... 43/53.5
[58] Field of Search ............................................... 43/53.5

[56] References Cited

U.S. PATENT DOCUMENTS

| D. 227,759 | 7/1973 | Enagureto | 43/53.5 |
|---|---|---|---|
| 1,731,070 | 10/1929 | Kimbrell | 43/53.5 |
| 1,777,695 | 10/1930 | Jeffery | 43/53.5 |
| 2,054,236 | 9/1936 | Behr | 43/53.5 |
| 2,289,810 | 7/1942 | Tallmadge | 43/53.5 |
| 2,537,879 | 1/1951 | Culhane, Jr. | 43/53.5 |
| 2,688,816 | 9/1954 | Bondesen | 43/53.5 |
| 2,795,887 | 6/1957 | Lockert | 43/53.5 |
| 2,892,284 | 6/1959 | Shawhan | 43/53.5 |
| 2,947,106 | 8/1960 | Lewan | 43/53.5 |
| 3,001,320 | 9/1961 | Sonner, Jr. | 43/53.5 |
| 3,011,286 | 12/1961 | Wallace | 43/53.5 |
| 3,419,924 | 1/1969 | Archibald | 43/53.5 |
| 3,588,078 | 6/1971 | Van De Sande | 43/53.5 |
| 3,721,034 | 3/1973 | Collins | 43/53.5 |
| 3,869,822 | 3/1975 | Tieman | 43/53.5 |
| 4,342,171 | 8/1982 | Cripps et al. | 43/53.5 |
| 4,389,770 | 6/1983 | Bocinski et al. | 29/764 |
| 4,590,702 | 5/1986 | Chestnutt | 43/53.5 |
| 4,833,817 | 5/1989 | Silverthorn | 43/53.5 |
| 5,201,139 | 4/1993 | Middleton | 43/53.5 |
| 5,307,586 | 5/1994 | Palmer | 43/53.5 |

FOREIGN PATENT DOCUMENTS 235367 of 1925 United Kingdom .................... 43/53.5

OTHER PUBLICATIONS

Fish Hook Remover Product of Unknown Individual, Sold at Sport Show at Imaly City, MI about 8–9 Years Ago (1989–1990).

Fish Hook Remover Product of South Bend Sporting Goods of Northbrook, IL 60065 Dated at Least as Early as Jan. of 1998.

*Primary Examiner*—Michael J. Carone
*Assistant Examiner*—Darren Ark
*Attorney, Agent, or Firm*—Peter D. Keefe

[57] ABSTRACT

A fishing hook remover having a selectively closed loop which protects the fish from trauma and retains the fishing line inside the loop, and further having set limits of optimum travel for its moving parts. The fishing hook remover has a plastic stator body and a plastic armature body which is mounted to the stator body in slidable in relation thereto. The stator body includes a hand rest at its near end and a flat fork at its distal end. The armature body includes a pair of finger holds at its near end, an open loop at its distal end, and a release button therebetween. The stator body includes an internal cavity into which is slidably interfaced the armature body, with the exceptions of the finger holds, the loop and the release button thereof. The armature body is resiliently biased relative to the stator body by a spring within the stator body in a direction toward the distal end thereof. Sliding movement of the armature body relative to the stator body is defined by cooperating abutments which define optimum limits of travel thereof.

14 Claims, 4 Drawing Sheets

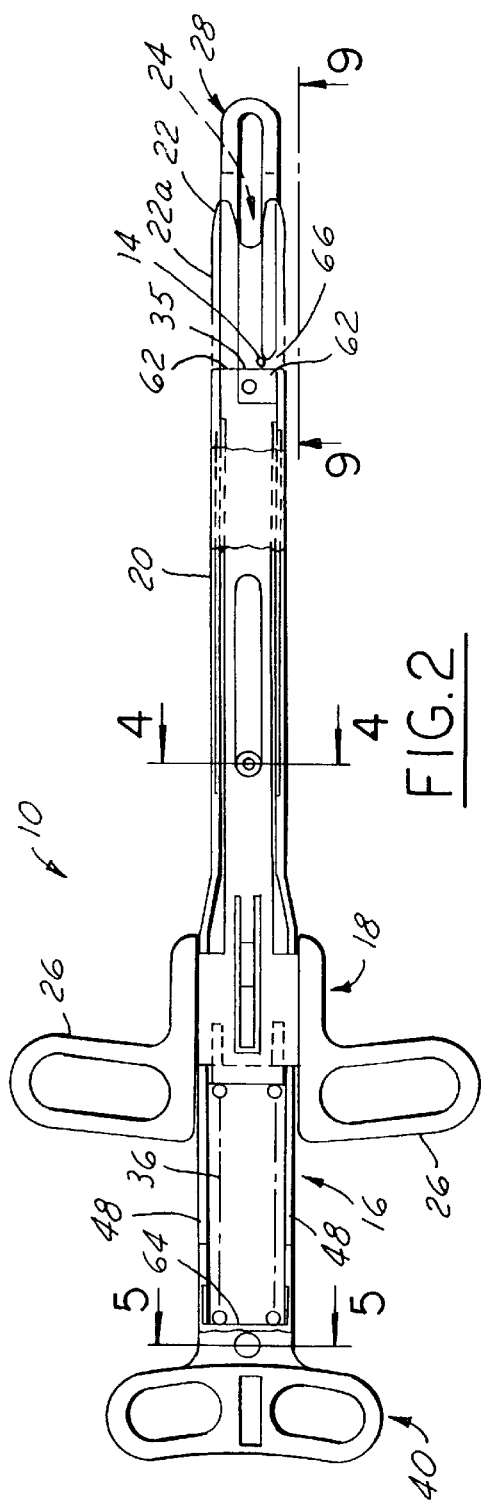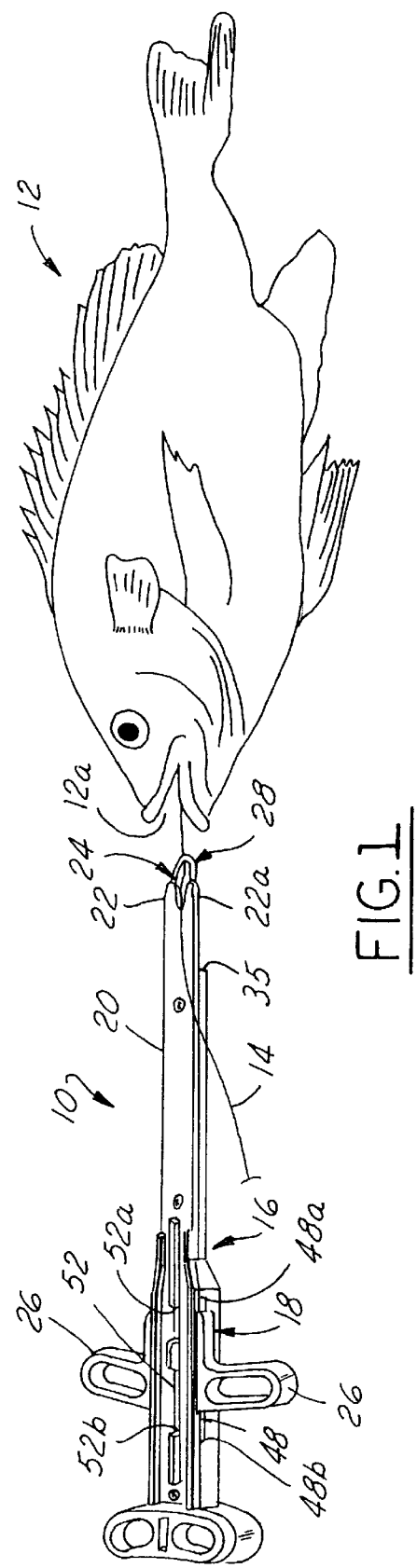

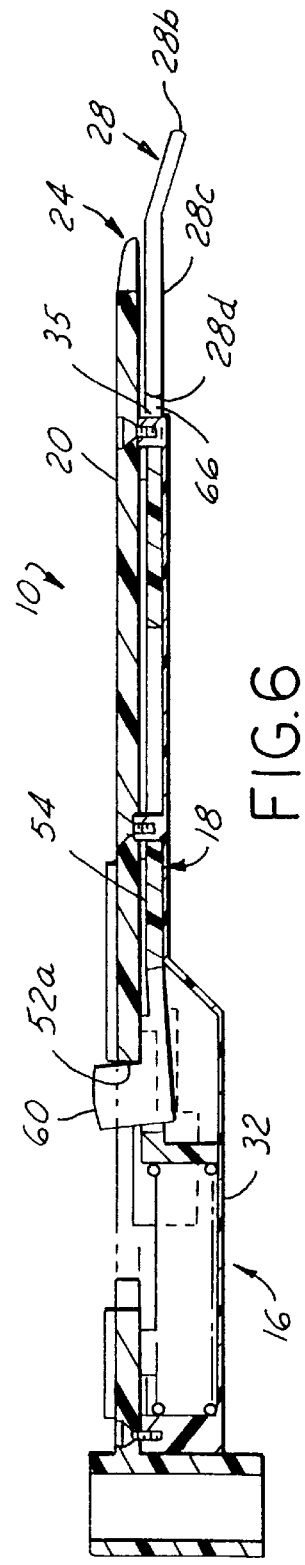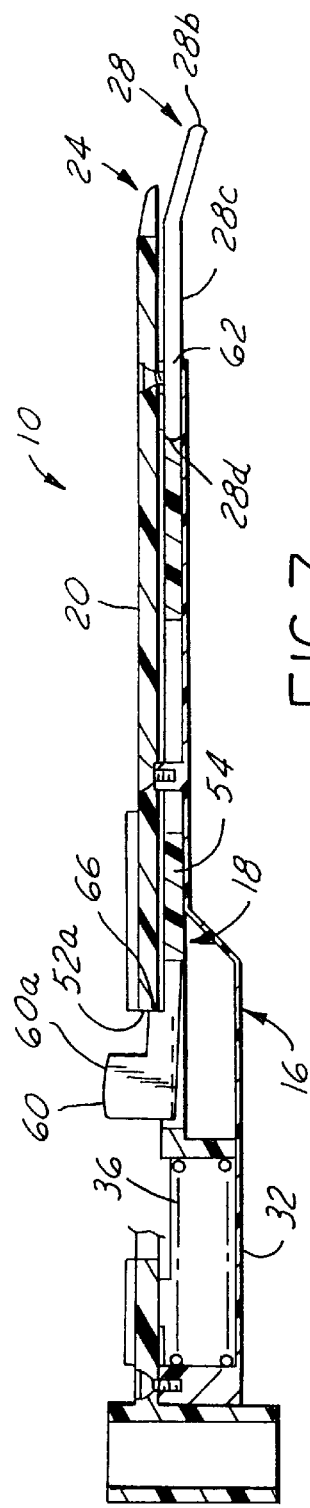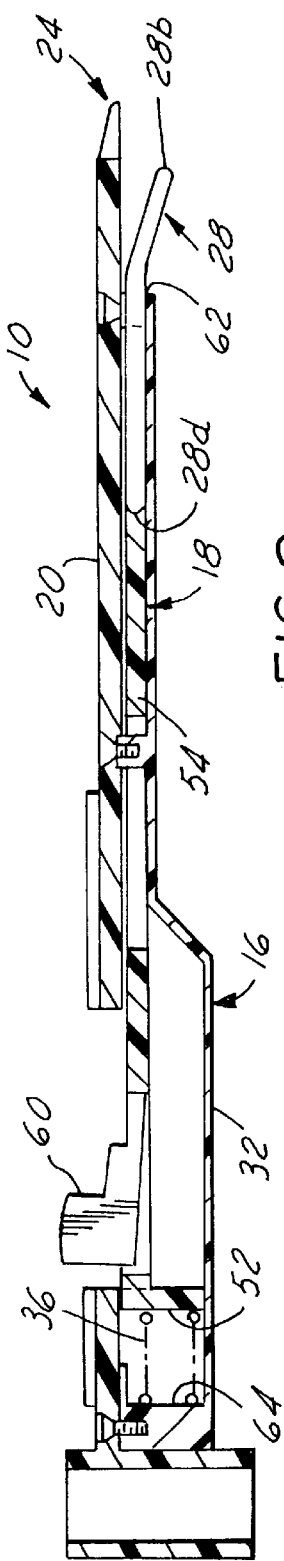

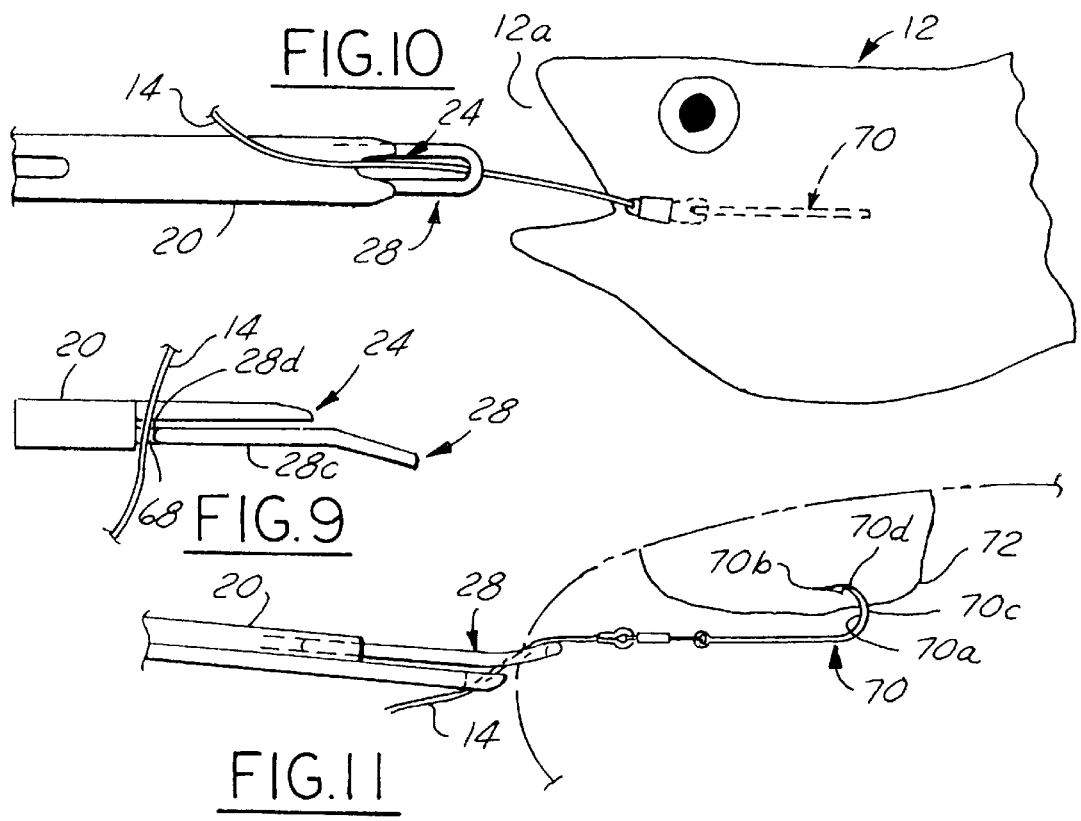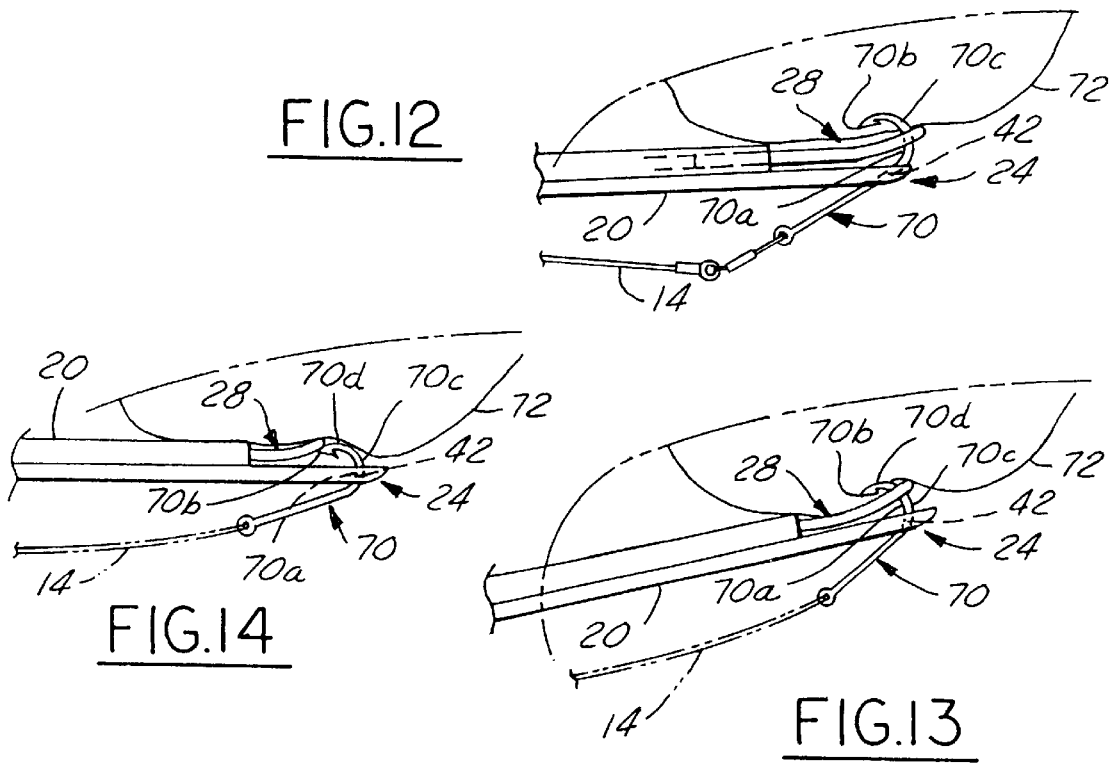

FISHING HOOK REMOVER

BACKGROUND OF THE INVENTION

1. Field of the Invention

The present invention relates to fishing hook removers for removing a fishing hook which has become hooked into the flesh of a fish. More particularly, the present invention relates to a selectively closed loop fishing hook remover.

2. Description of the Prior Art

While fishing is certainly one of the most relaxing and enjoyable of all sports, those times when a fishing hook is recalcitrantly lodged inside a fish can be a time of frustration and effort. This is because fishing hooks have barbs on them which are intended to impede the fishing hook from backing out of the flesh to which it is hooked. Not only is removing a fishing hook made difficult because of the barb, but also because many fish have sharp teeth, may be difficult to grasp because of their slimy skin, and/or because they are squirming too much. Further, some people are a bit squeamish about removing fishing hooks from inside a fish. For all these reasons, it would be a great help if a tool could be provided which makes removal of fishing hooks simple, easy and efficient.

Two prior art fishing hook removers are worthy of mention.

A first prior art fishing hook remover utilizes an L-shaped metallic tube having a down-leg portion terminating at a near end of the tube and an extension portion terminating at a distal end of the tube. At the distal end is formed a flat fork. A resilient wire connects with the near end and is spaced from the down-leg portion, enters into the extension portion and emerges as an open loop at the distal end.

A second prior art fishing hook remover utilizes an L-shaped metallic rod member having a down-leg portion and an extension portion terminating in a flat fork at a distal end of the rod. The extension member is received into a metallic tube which is spring biased with respect to the rod, wherein the fork projects outwardly from a distal end of the tube. An open loop is connected to the distal end of the tube.

In operation of these prior art fishing hook removers, there is the problem that the loop is always open whereby the freely disposed terminal end of the loop can easily cause snagging or violent tearing of the flesh of the flesh which is inhumane and a problem of life or death consequences if the fish is to be returned to the water. Further, both of these devices are structurally crude and inefficient in operation because they do not have set limits of travel for the moving parts, they have potential for corrosion of metal parts, they do not prevent the fishing line from sliding off from the open loop, and they lack a complete radius form.

Accordingly, what is needed in the art is a fishing hook remover having a selectively closed loop, will all the attendant advantages thereof.

SUMMARY OF THE INVENTION

The present invention is a fishing hook remover having a selectively closed loop which protects the fish from trauma and retains the fishing line inside the loop, and further having set limits of optimum travel for its moving parts.

The fishing hook remover according to the present invention is composed of a stator body and an armature body which is mounted to the stator body in slidable in relation thereto. The stator body includes a hand rest at its near end and a flat fork at its distal end. The armature body includes a pair of finger holds at its near end, an open loop at its distal end, and a release button therebetween. The stator body includes an internal cavity into which is slidably interfaced the armature body, with the exceptions of the finger holds, the loop and the release button thereof. The armature body is resiliently biased relative to the stator body by a spring within the stator body in a direction toward the distal end thereof. Sliding movement of the armature body relative to the stator body is defined by cooperating abutments which define optimum limits of travel thereof. In this regard, there are two protrusive limits: a first protrusive limit wherein the loop is in an open configuration and a second protrusive limit wherein the loop is in a closed configuration. Further in this regard, there is a retractive limit wherein the finger holds are brought a maximum amount toward the hand rest. At the first and second protrusive limits, an apical bend of the loop extends forward of the fork, whereas at the retractive limit the apical bend of the loop is retracted inwardly from the base of the fork.

In operation, a user presses the release button to cause the spring to drive the armature body to the first protrusive limit, whereupon the loop is open in relation to the stator body. The fishing line (of the fishing hook to be removed from a fish) is placed into the loop via the gap thereby formed. The user now retracts the finger holds toward the hand rest, whereupon the second protrusive limit is reached and the loop is now closed relative to the stator body. The user now brings the base of the fork abuttingly against the inner curved surface of the fishing hook, wherein the loop is between the fork and the point of the fishing hook. Now, in order to free the fishing hook from the flesh of the fish, the user gently retracts the finger holds toward the hand rest. In so doing, the loop follows the outer curved surface of the fishing hook and follows along the outer straight surface of the fishing hook until the retractive limit is reached, all the while pushing the flesh toward the point of the fishing hook. When the apical bend of the loop is at the point of the fishing hook, the fishing hook has been freed from the flesh of the fish.

Accordingly, it is an object of the present invention to provide a fishing hook remover having a selectively closeable loop.

It is an additional object of the present invention to provide a fishing hook remover having predetermined limits of optimum travel It is yet a further object of the present invention to provide a fishing hook remover which does not risk trauma to the fish during the fishing hook removal process.

These, and additional objects, advantages, features and benefits of the present invention will become apparent from the following specification.

BRIEF DESCRIPTION OF THE DRAWINGS

FIG. 1 is a perspective view of the fishing hook remover according to the present invention being used to remove a fishing hook from a fish.

FIG. 2 is a partly sectional plan view of the fishing hook remover according to the present invention.

FIG. 6 is a partly sectional side view of the fishing hook remover according to the present invention, shown with the armature body at the first protrusive limit.

FIG. 7 is a partly sectional side view of the fishing hook remover according to the present invention, shown with the armature body at the second protrusive limit.

FIG. 8 is a partly sectional side view of the fishing hook remover according to the present invention, shown with the armature body at the retractive limit.

FIGS. 10 through 14 show progressive steps of a fishing hook removal process using the fishing hook remover according to the present invention.

DETAILED DESCRIPTION OF THE PREFERRED EMBODIMENT

Figure 4:
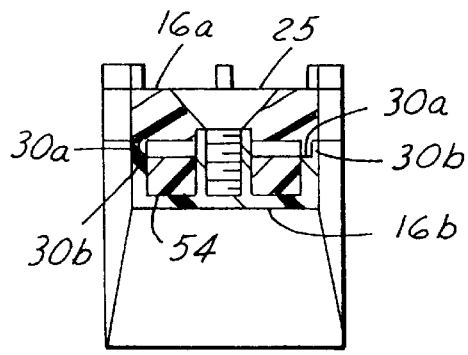
FIG. 4 is a partly sectional view of the fishing hook remover according to the present invention, seen along line 4—4 in FIG. 2.

FIG. 1 depicts a typical environment of operation of the fishing hook remover 10 according to the present invention, wherein a fish 12 has swallowed a fishing hook (see FIGS. 10 through 13) associated with a fishing line 14. In this regard, the fishing hook remover 10 includes a stator body 16 and an armature body 18 which is slidably interconnected therewith. The stator body 16 has an extension portion 20 which has a distal end portion 22a wherein the distal end 22 thereof is characterized by fork 24. The armature body includes a pair of finger holds 26 which are external to the stator body 16, and further includes a selectively closeable loop 28 adjacent the fork 24.

In operation, a user places the fishing line 14 into the loop 28 and inserts the extension portion 20 into the mouth 12a of the fish 12 until the fork 24 abuts the fishing hook. Then the user pulls upon the finger holds 26 to cause the loop 28 to retract relative to the fork and thereby force the flesh of the fish off from the fishing hook.

The structure and function of the fishing hook remover 10 will now be detailed with greater specificity with additional reference being directed to remaining FIGS. 2 through 14.

Figure 5:
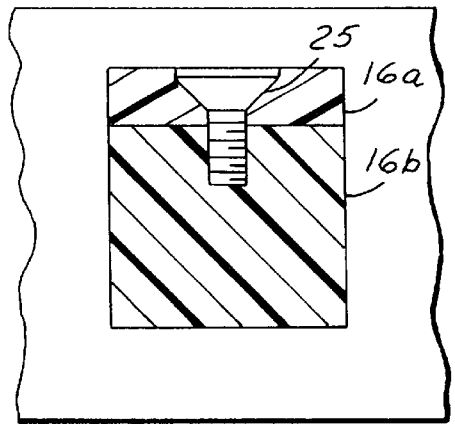
FIG. 5 is a partly sectional view of the fishing hook remover according to the present invention, seen along line 5—5 in FIG. 2.
Figure 3:
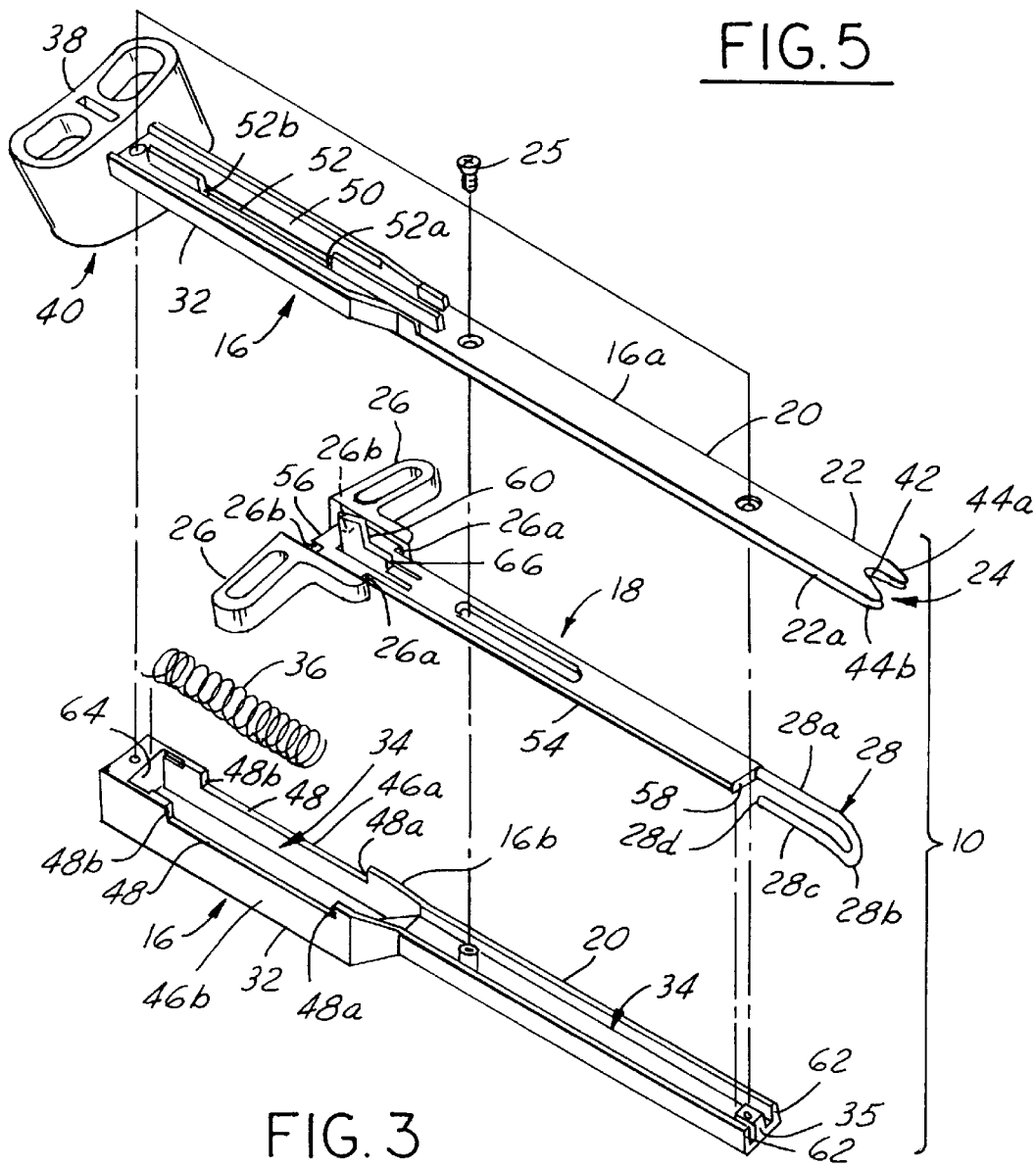
FIG. 3 is an exploded perspective view of the fishing hook remover according to the present invention.

As best shown at FIG. 3, the stator body 16 is preferably formed of upper and lower stator components 16a, 16b, which are joined together by any known modality, such as a fastener or an adhesive, but most preferably by threaded fasteners 25 as shown at FIGS. 4 and 5. In this regard, it is preferred for alignment grooves 30a to interact with respective alignment slots 30b so as to provide a good fit between the upper and lower stator components 16a, 16b. In the preferred embodiment, the distal end portion 22 is connected with the upper stator component 16a and projects forwardly of a foot 35 of the lower stator component 16b. The preferred material of the stator body 16 is plastic, formed by an injection molding process.

The stator body 16 includes a rear portion 32 and the aforementioned extension portion 20. A body cavity 34 is formed in the stator body 16 for receiving a portion of the armature body 18, and further for receiving a spring 36, wherein the spring is located at the rear portion 32.

The rear portion 32 terminates at a near end 38 whereat a hand rest 40 is located, wherein the hand rest is preferably connected with upper stator component 16a. The hand rest 40 is enlarged and concavely contoured for being comfortably interfaced with a user's thumb or inside portion of the user's hand. The extension portion 20 has the aforementioned distal end portion 22 which terminates in the earlier mentioned fork 24. The fork 24 is flatly configured and has a base 42 formed between two smoothly radiused tines 44a, 44b thereof.

Each of the left and right sides 46a, 46b of the rear portion 32 have a respective side slot 48, wherein the side slots each have a forward end 48a and a rearward end 48b. The upper side 50 of the rear portion 32 has an upper slot 52 having a forward end 52a and a rearward end 52b.

The armature body 18 is preferably composed of plastic formed via an injection molding process. The armature body 18 includes the following integral components: a bar 54 having a near end 56 and a distal end 58; a pair of mutually opposing finger holds 26 connected to the near end 56; the aforementioned open loop 28 connected to the distal end 58 and a release button 60 resiliently connected to the bar between the near and distal ends thereof.

When the upper and lower stator components 16a, 16b are joined, the bar 54 of the armature body 18 is placed into the body cavity 34, wherein the finger holds 26 project through the side slots 48, the release button 60 projects through the upper slot 52, and the loop 28 projects outwardly from the foot 35 of the lower stator component 16b. With regard to the loop 28, the loop has a base leg 28a, an apical bend 28b and an open leg 28c terminating at a terminus 28d. The foot 35 of the lower stator component 16b is provided with a pair of apertures 62 through which, respectively, the base leg 28a and open leg 28c are slidably interfaced. Further, the spring 36 is compressed in that at one end it abuts a wall 64 of the body cavity and at the other end it abuts the near end 56 of the bar 54. Lastly, the release button 60 includes a forwardly disposed land 66 for selectively abutting the forward end 52a of the upper slot 52.

Turning now to FIGS. 6 through 8, the interplay between the stator and armature bodies 16, 18 will be more fully discussed. In this regard, the armature body 18 slides with respect to the stator body 16, wherein three distinct limits of travel are involved: a first protrusive limit, as shown at FIG. 6; a second protrusive limit, as shown at FIG. 7; and a retractive limit, as shown at FIG. 8.

FIG. 6 depicts the armature body 18 at the first protrusive limit of travel This limit of travel is defined by a base 26a of the finger holds 26 abutting the forward end 48a of the side slots 48. At the first protrusive limit, the apical bend 28b of the loop 28 extends forwardly of the fork 24, and the terminus 28d of the open leg 28c is separated from the foot 35 of the stator body 16, thereby forming a gap 66 and whereby the loop is in an open configuration.

FIG. 7 depicts the armature body 18 at the second protrusive limit of travel This limit of travel is defined by the land 66 of the release button abutting the forward end 52a of the upper slot 52. At the second protrusive limit, the apical bend 28b of the loop 28 extends less forwardly of the fork 24 than at the first protrusive limit, and the terminus 28d of the open leg 28c has entered into its aperture 62, whereupon the loop is in a closed configuration.

FIG. 8 depicts the armature body 18 at the retractive limit of travel This limit of travel is defined by the base 26b of the finger holds 26 abutting the rearward end 48b of the side slots 48. At the retractive limit, the apical bend 28b of the loop 28 is rearward of the base 42 of the fork 24, and both the base leg 28a and open leg 28c remain received into their respective apertures 62 (ie., the loop is still in the closed configuration).

Operation of the fishing hook remover 10 will now be detailed, wherein reference is directed most particularly to the progressive series of environmental operation views of FIGS. 9 through 14.

Firstly, the user grasps the fishing hook remover 10 via the rear portion 32 of the stator body 16, and then presses down on the release button 60 so as to clear the land 66 thereof of the forward end 52a of the upper slot 52. The release button 60 has a gently rounded and downwardly tapering top 60a (see FIG. 7) which facilitates the button sliding forward under finger or thumb pressure, due to the urging forward of the armature body 18 by the compression of the spring 36. The armature body is now at the first protrusive limit. As shown at FIG. 9, the fishing line 14 is passed through the gap 68 and into the loop 28. Now, the user pulls the finger holds 26 rearwardly toward the near end 38 of the stator body (ie., the hand rest 40) until the land resiliently raises to abut the forward end of the upper slot. Now, with the armature body at the second protrusive limit (as shown at FIGS. 10 and 11) the fishing hook remover is ready to be used to remove the fishing hook 70 from the flesh 72 of a fish 12.

The extension portion 20 is placed into the mouth 12a of the fish, and the fork 24 is brought to the fishing hook whereat the base 42 of the fork abuts the inside curved surface 70a thereof, wherein the tines 44a, 44b serve to center the fishing hook into the fork, and wherein the orientation of fishing hook remover is such that the loop is between the fork and the point 70b of the fishing hook.

In order to free the fishing hook from the flesh of the fish, the user gently retracts the finger holds toward the distal end of the stator body (ie., the hand rest). In so doing, the loop follows the outer curved surface 70c of the fishing hook and follows along the outer straight surface 70d of the fishing hook until the retractive limit is reached, all the while pushing the flesh toward the point of the fishing hook. To facilitate this following of the fishing hook, the loop 24 is preferably acutely angled away from the distal end portion 22. When the apical bend of the loop is at the point of the fishing hook, the fishing hook has been freed from the flesh of the fish (see FIG. 14).

The user then releases the finger holds to allow the armature body to thrust forward to the second protrusive limit, and thereafter again presses the release button to allow the spring to thrust the armature body forward toward the fork to the first protrusive limit, whereupon the gap 68 has reappeared. Now, the fishing line is removed from the loop by passage out through the gap. Thereafter, the task at hand has been completed with little to no trauma to the fish and very little effort on the part of the user.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A fishing hook remover comprising:
   a stator body having a near end and an opposite distal end; said distal end of said stator body having a fork;
   an armature body having a loop, said loop having an apical bend;
   means for slidably connecting said armature body to said stator body, wherein said loop is adjacent to said fork;
   biasing means for resiliently biasing said armature body in a direction toward said fork;
   loop selection means for selectively switching between a closed loop configuration of said loop and an open loop configuration of said loop; and
   travel limit means for providing three distinct limits of travel of said armature body with respect to said stator body;
   wherein said limits of travel comprise:
      a first protrusive limit wherein said loop is at said open loop configuration and said apical bend protrudes forwardly with respect to said fork;
      a second protrusive limit wherein said loop is at said closed loop configuration and said apical bend protrudes forwardly with respect to said fork; and
      a retractive limit wherein said loop is at said closed loop configuration and said apical bend is retracted rearwardly with respect to said fork; and
   wherein said travel limit means comprises:
      forward abutment means of said stator body for abutting a first selected location of said armature body to thereby define said first protrusive limit;
      rearward abutment means of said stator body for abutting a second selected location of said armature body to thereby define said retractive limit; and
      release button means for providing a selective abutment between said stator and armature bodies to thereby define said second protrusive limit.

2. The fishing hook remover of claim 1, wherein said stator and armature bodies are composed of plastic.

3. The fishing hook holder of claim 1, wherein said release button means comprises a release button resiliently connected with said armature body, said release button having a land for selectively abutting said stator body.

4. The fishing hook remover of claim 3, wherein said loop further comprises a base leg integrally connected at one end thereof to said armature body and connected at the other end thereof to a first side of said apical bend, and a open leg connected at one end thereof to a second side of said apical bend and terminating in a freely disposed terminus; said loop selection means comprising said stator body having aperture means for therein receiving said terminus of said open leg when said loop is at said closed loop configuration; wherein when said loop is in said open configuration said terminus is spaced from said stator body to thereby provide a gap with respect thereto.

5. The fishing hook remover of claim 4, further comprising finger hold means connected with said armature body for a user to grasp so as to cause said armature body to move toward said near end of said stator body.

6. The fishing hook remover of claim 5, wherein a portion of said armature body is located inside said stator body; and wherein said forward and rearward abutment means comprise slot means formed in said stator body for providing a space through which said finger hold means projects through said stator body, wherein a forward end of said slot means provides said forward abutment means and a rearward end of said slot means provides said rearward abutment means; wherein said first and second locations are located on a base of said finger hold means.

7. The fishing hook remover of claim 6, wherein said stator and armature bodies are composed of plastic.

8. A fishing hook remover comprising:
   a stator body having a near end and an opposite distal end; said distal end of said stator body having a fork;
   an armature body having a loop;
   means for slidably connecting said armature body to said stator body, wherein said loop is adjacent said fork;
   biasing means for resiliently biasing said armature body in a direction toward said fork;
   loop selection means for selectively switching between a closed loop configuration of said loop and an open loop configuration of said loop; and
   travel limit means for providing three distinct limits of travel of said armature body with respect to said stator body
   wherein said loop has an apical bend, said loop further comprising a base leg integrally connected at one end thereof to said armature body and connected at the other end thereof to a first side of said apical bend, and a open leg connected at one end thereof to a second side of said apical bend and terminating in a freely disposed terminus; said loop selection means comprising said stator body having aperture means f or therein receiving said terminus of said open leg when said loop is at said closed loop configuration; wherein when said loop is in said open configuration said terminus is spaced from said stator body to thereby provide a cap with respect thereto; and wherein said limits of travel comprise:
   a first protrusive limit wherein said loop is at said open loop configuration and said apical bend protrudes forwardly with respect to said fork;
   a second protrusive limit wherein said loop is at said closed loop configuration and said apical bend protrudes forwardly with respect to said fork; and
   a retractive limit wherein said loop is at said closed loop configuration and said apical bend is retracted rearwardly with respect to said fork.

9. The fishing hook remover of claim 8, wherein said stator and armature bodies are composed of plastic.

10. The fishing hook remover of claim 8, wherein said travel limit means comprises:

forward abutment means of said stator body for abutting a first selected location of said armature body to thereby define said first protrusive limit;

rearward abutment means of said stator body for abutting a second selected location of said armature body to thereby define said retractive limit; and release button means for providing a selective abutment between said stator and armature bodies to thereby define said second protrusive limit.

11. The fishing hook remover of claim 10, wherein said release button means comprises a release button resiliently connected with said armature body, said release button having a land for selectively abutting said stator body.

12. The fishing hook remover of claim 11, further comprising finger hold means connected with said armature body for a user to grasp so as to cause said armature body to move toward said near end of said stator body.

13. The fishing hook remover of claim 12, wherein a portion of said armature body is located inside said stator means; and wherein said forward and rearward abutment means comprise slot means formed in said stator body for providing a space through which said finger hold means projects through said stator body, wherein a forward end of said slot means provides said forward abutment means and a rearward end of said slot means provides said rearward abutment means; wherein said first and second locations are located on a base of said finger hold means.

14. The fishing hook remover of claim 13, wherein said stator and armature bodies are composed of plastic.

* * * * *